(No Model.)

M. EMME.
GROUND GENERATOR OF ELECTRICITY.

No. 495,582. Patented Apr. 18, 1893.

Attest:
C. W. Benjamin,
H. G. Tuchman

Inventor:
Michael Emme
by Read & Price
his attys.

THE NORRIS PETERS CO., PHOTO-LITHO., WASHINGTON, D. C.

UNITED STATES PATENT OFFICE.

MICHAEL EMME, OF OAKLAND, CALIFORNIA.

GROUND GENERATOR OF ELECTRICITY.

SPECIFICATION forming part of Letters Patent No. 495,582, dated April 18, 1893.

Application filed August 29, 1892. Serial No. 444,391. (No model.)

*To all whom it may concern:*

Be it known that I, MICHAEL EMME, a citizen of France, residing at Oakland, in the county of Alameda and State of California, have invented certain new and useful Improvements in Ground Generators of Electricity; and I do hereby declare the following to be a full, clear, and exact description of the invention, such as will enable others skilled in the art to which it appertains to make and use the same.

My invention relates to chemical generators of electricity, a prepared body of earth being used as the support and exciting medium for the electrodes or elements. In a generator constructed in accordance with my invention, any desired number of elements may be assembled in the same piece of ground and coupled in series or multiple series to produce the electro-motive force desired. I find that if a series of galvanic couples be inserted in a body of ground so that a straight line will pass transversely through the several couples and the space between the several couples be made large comparatively to the distance between the two elements composing the couples, the couples may be joined for series in the same manner as if they were contained in independent vessels. In order, however, to attain the best results it is necessary to prepare the body of soil immediately adjacent to the two elements composing a couple in a manner which will be hereinafter fully described.

The several features of novelty of the invention will be hereinafter more fully described in this specification and definitely indicated in the claims appended to this specification.

Figure 1:
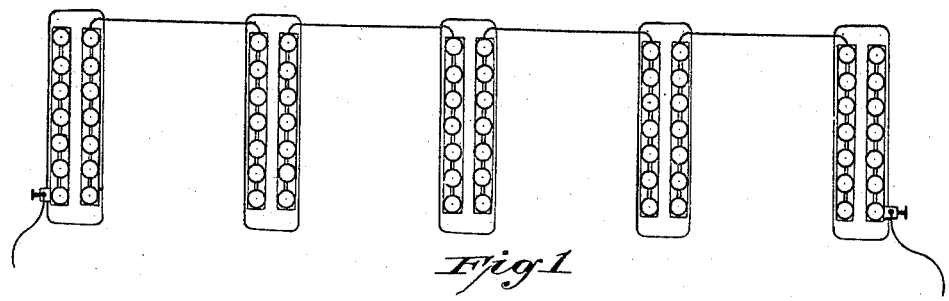
Figure 2:
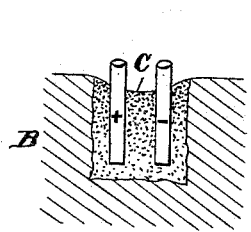
Figure 3:
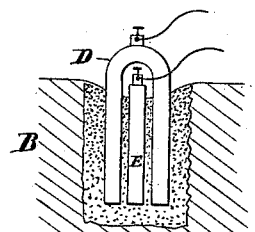
Figure 4:
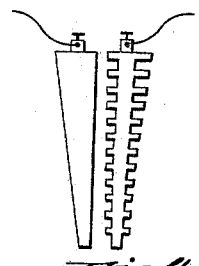
Figure 5:
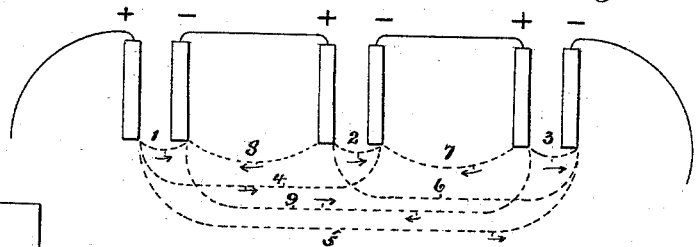
Figure 6:
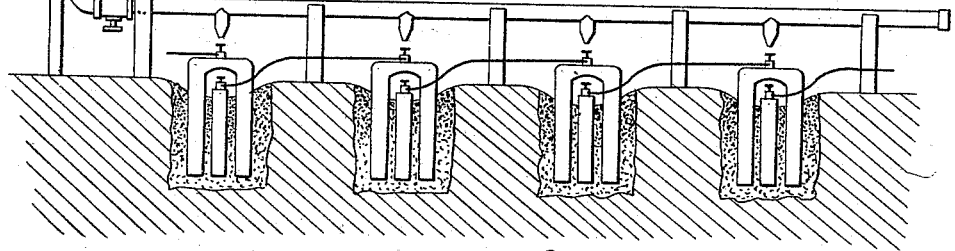

In the accompanying drawings Figure 1 illustrates an earth generator in which the several couples are arranged in series. Figs. 2 and 3 show a cross section of ground containing one couple. Fig. 4 shows wedge shaped electrodes. Fig. 5 shows the co-operation of the internal circuits of the several couples. Fig. 6 shows the means for supplying an excitant or moistening medium periodically to the several couples.

Any character of soil may be adapted for use with my ground generator by saturating that portion of it surrounding the several elements with a suitable solution rich in oxygen, chlorine, bromine, iodine or fluorine, or with a solution of a salt of an alkali. As elements I prefer to use iron as a positive electrode and hard pressed coke carbon for the negative electrode. The positive electrode is preferably a U-shaped bar of iron round in cross section. The two limbs of the U straddle a rod of carbon. The iron should be soft wrought iron. Cast iron also can be used, but I find that cast iron gives a little less electro-motive-force, probably by reason of the percentage of carbon and other impurities contained therein. Magnesium also yields excellent results producing with carbon a voltage of 2.25. Zinc, aluminium or any metal with which the ground and its contained salts or exciting medium will develop electrolytic action may be used with varying results.

In carrying my invention into practice I level a piece of ground of sufficient area to contain the generator. For instance, for three hundred positive elements each twenty inches long and two inches in diameter bent as indicated in Fig. 3, and three hundred negative elements fifteen inches long and three inches in diameter, the length of the piece of ground should be about one hundred feet and its width about three feet. I dig forty-three holes, at a distance of thirty inches apart from center to center, in a line as indicated in Fig. 1. Each hole is ten inches wide and thirty inches broad and of a depth sufficient to contain the elements. The loose soil dug from the ground is mixed with a proper salt or acid to render the generator active. For instance, if the ground is a vegetable mold commercial concentrated nitric acid should be added in sufficient quantity to saturate the soil, and peroxide of manganese or pyrolusite should be mixed with the mass. If the soil be of a sandy character hydrochloric acid or carbonate of soda or potash may be substituted for the materials just mentioned. Should the soil be of a clayey character hydrochloric or sulphuric acid and chloride of sodium may be used, the salt being dissolved in water and poured in the hole before the acid is mingled with the soil. The bottom of the hole is moistened with water and the prepared soil mixed with water to the consistency of a thick paste is then introduced, the composite elements being immersed in it. The several groups of elements thus arranged may be connected in series by conductors as shown in Fig. 1, though the generator will act without any external conductors except the terminal wires. A generator constructed as above described will yield 53.85 volts and fifty-six ampères, developing a total of 3,015.60 watts, or about four horse-power. By increasing the number of cells the capacity of the generator may be correspondingly increased to any desired horse-power. The couples may be joined in simple series or in multiple series. The prepared body of soil should be periodically moistened preferably with the acid with which it was treated when first prepared for action, and in a plant constructed for continuous action I prefer to provide a reservoir as indicated at A in Fig. 6 and run a pipe of a material not attacked by the acid throughout the plant providing nozzles over the several couples so that they may be moistened when desired. With provisions of this nature the soil may be kept in a substantially uniform condition and the generator rendered continuously serviceable. Any accumulation of oxides or other products of the reaction between the prepared soil and the elements may be removed and a clean metal surface exposed for chemical action by raising the positive electrode and then forcing it back into place again. The carbon may be cleansed by simply turning it without lifting it from its place.

I find that the period of activity of the generator during which no addition of salt or acid is required increases with the length of service. For example, during the first day of use the exciting medium should be added after ten hours of work, after which it will yield twenty-six hours of service, and then after another addition of excitant it will yield service for two days, and so on.

In Fig. 1 is represented a generator the several electrodes of which are composed of rods grouped in multiple and arranged as indicated in Fig. 2 where B represents the solid ground and C the mass of prepared soil.

In Fig. 3 is shown a preferable shape of electrodes, D representing an iron electrode and E a carbon.

A wedge shaped electrode as shown in Fig. 4 permits easy withdrawal from the soil and the corrugation increases the extent of active surface.

In Fig. 5 are indicated the internal circuits of the generator. The several couples may be interconnected by conductors placed exterior to the ground as indicated by F or the conductors may be dispensed with, (although inferior results are obtained by such an arrangement) as indicated at G.

The dotted lines Fig. 5 indicate the directions of electro-motive-force in the internal circuits, 1, 2, 3, 4, 5, 6 being in one direction and 7, 8 and 9 in an opposite direction. There is a resultant or differential electro-motive-force which develops current in the external circuit.

I am not prepared to state the cause of constancy of action in the generator constructed as hereinbefore described, but I ascribe it to the mutual assistance of the several elements of the series, each positive element finding a conducting medium to all of the negative elements of the series as indicated by dotted lines in Fig. 5, the solid ground acting as a conducting medium. Thus the internal resistance of the generator is lowered and the output of the generator consequently increased. The fact that such internal circuits actually exist may be demonstrated by the interposition of a voltmeter in the ground between successive pairs of elements; the whole body of earth in the neighborhood of the generator seems to be permeated with stream lines of electric energy. This fact probably assists in some way to prevent polarization of the negative electrodes as the battery acts with great constancy.

Having thus described my invention, what I claim as new, and desire to secure by Letters Patent, is—

1. A generator of electricity comprising a series of galvanic couples each couple being embedded in an electrolytic medium composed of earth mixed to a pasty consistency with an exciting solution the spaces between the several couples being occupied by unprepared earth.

2. A ground generator of electricity comprising a series of galvanic couples embedded in an electrolytic medium composed of earth mixed to a pasty consistency with a suitable excitant and filled in holes formed at intervals in the earth.

3. A ground generator of electricity comprising a series of galvanic couples embedded in the earth and connected in series relation, the distance between the several couples being large compared to the distance between the elements of any couple, and a reservoir for periodically supplying a moistening medium and maintaining the action of the generator.

In testimony whereof I affix my signature in presence of two witnesses.

MICHAEL EMME.

Witnesses:
 LINCOLN SONNTAG,
 CHAS. SONNTAG.